(12) United States Patent  
Hong et al.

(10) Patent No.: US 8,376,264 B1  
(45) Date of Patent: Feb. 19, 2013

(54) ROTOR FOR A DUAL MODE AIRCRAFT

(76) Inventors: Jianhui Hong, Tulsa, OK (US); Jinru Wu, Tulsa, OK (US)

( * ) Notice: Subject to any disclaimer, the term of this patent is extended or adjusted under 35 U.S.C. 154(b) by 849 days.

(21) Appl. No.: 12/546,656

(22) Filed: Aug. 24, 2009

(51) Int. Cl.
*B64C 27/26* (2006.01)

(52) U.S. Cl. ..................................... 244/7 A; 244/17.23

(58) Field of Classification Search .............. 244/6, 7 R, 244/7 A, 7 C, 8, 17.23, 17.25, 39
See application file for complete search history.

(56) References Cited

U.S. PATENT DOCUMENTS

| | | | | |
|---|---|---|---|---|
| 2,008,843 | A * | 7/1935 | Smith | 244/6 |
| RE21,478 | E * | 6/1940 | Smith | 244/6 |
| 2,629,570 | A | 2/1953 | Carnahan | 244/7 R |
| 2,687,779 | A * | 8/1954 | Peterson | 60/244 |
| 2,715,506 | A | 8/1955 | Peterson | |
| 2,879,013 | A | 3/1959 | Herrick | |
| 3,207,457 | A | 9/1965 | Kisovec | |
| 3,327,969 | A | 6/1967 | Head | |
| 3,404,852 | A * | 10/1968 | Sambell et al. | 244/7 A |
| 3,494,707 | A | 2/1970 | Kisovec | |
| 3,515,500 | A | 6/1970 | Nachod | |
| 3,771,924 | A * | 11/1973 | Buchstaller | 416/121 |
| 4,059,247 | A | 11/1977 | Prewitt | |
| 4,711,415 | A | 12/1987 | Binden | |
| D309,464 | S | 7/1990 | Salomonsson | |
| 5,085,315 | A * | 2/1992 | Sambell | 244/7 R |
| 5,405,104 | A | 4/1995 | Pande | |
| 5,454,530 | A | 10/1995 | Rutherford et al. | |
| 6,561,455 | B2 * | 5/2003 | Capanna | 244/7 R |
| 7,014,142 | B2 | 3/2006 | Barocela et al. | |
| 2010/0072325 | A1 * | 3/2010 | Sambell | 244/7 A |
| 2010/0243820 | A1 * | 9/2010 | Lim | 244/7 A |
| 2010/0243821 | A1 * | 9/2010 | Lim | 244/7 A |
| 2011/0180673 | A1 * | 7/2011 | Lim | 244/7 A |

OTHER PUBLICATIONS

Stepniewski, W. Z., et al. "Open Airscrew VTOL Concepts." NASA Contractor Report #177603. Sep. 1992.*
NASA technical reports: 177578, 177585, 177590, 177592 and 177603.

* cited by examiner

*Primary Examiner* — Tien Dinh
*Assistant Examiner* — Michael Kreiner
(74) *Attorney, Agent, or Firm* — Eric Karich

(57) ABSTRACT

A rotor for use on an aircraft has a plurality (N) of rotor blades mounted on a plurality (N) of concentric masts. Each of the rotor blades has a rounded leading edge and a tapered trailing edge. The plurality (N) of concentric masts each operably mount one of the plurality of rotor blades at N different elevations. A locking element selectively locks or unlocks the concentric masts together in a plane of rotation, enabling the angle between any two rotor blades to be variable from 0-360 degrees during flight. A feathering hinge is operably attached to each blade for changing the pitch of each blade with respect to the plane of rotation as controlled by a pitch control mechanism.

10 Claims, 11 Drawing Sheets

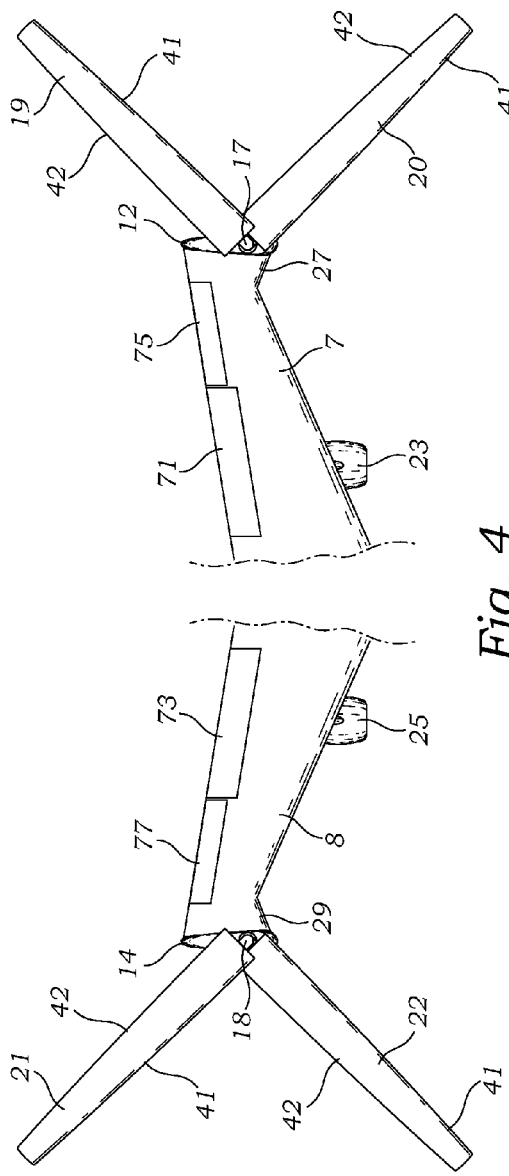
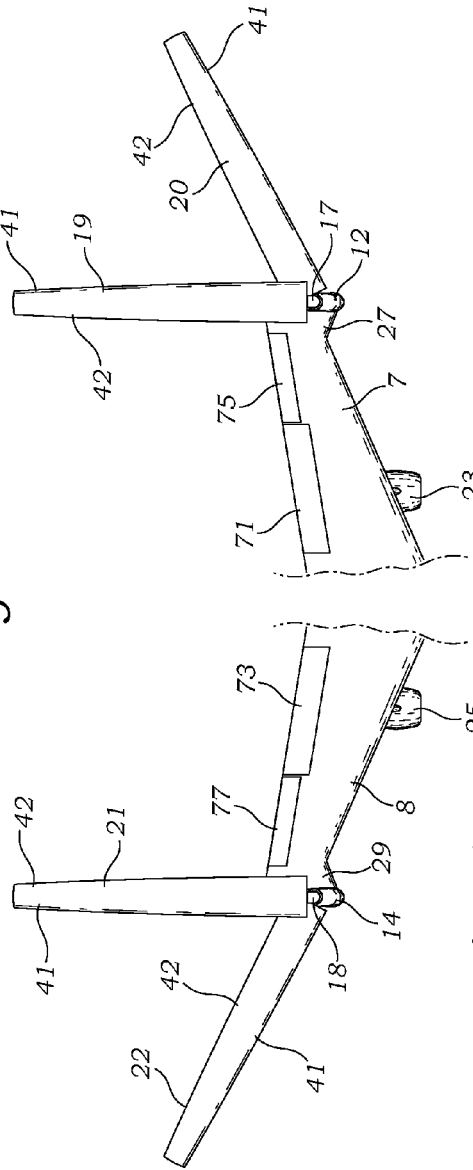
Fig. 4
Fig. 5

ROTOR FOR A DUAL MODE AIRCRAFT

BACKGROUND OF THE INVENTION

1. Field of the Invention

This invention relates generally to aerial vehicles such as manned or unmanned aerial vehicles, and more particularly to dual-mode aerial vehicles that can fly in both a rotary wing mode and a fixed wing mode.

2. Description of Related Art

Rotary wing aircraft such as helicopters and gyroplanes cannot fly forward at high speeds like fixed wing aircraft. Due to the phenomenon known as the "dissymmetry of lift" caused by the differences in relative air speeds between the advancing blade and the retreating blade, the compressability effect of the advancing blade, the retreating blade stall, and the excessive drag caused by the rotating wings at higher speeds, there is a relatively low speed limit a helicopter or a gyroplane can not exceed. Assuming the aircraft is flying forward, blade retreating occurs when a blade rotates from the aircraft's nose to the tail, which is opposite to the direction of flight. Blade advancing occurs as a blade rotates from the aircraft's tail to the nose, which is the same as the direction of flight. Blade retreating occurs in two quadrants (i.e, half circle, or 180 degrees) in the plane of rotation, and blade advancing occurs in the other two quadrants in the plane of rotation.

A fixed wing aircraft does not suffer the dissymmetry of lift, and is possible to fly at high subsonic, and even transonic or supersonic speeds. However, conventional fixed wing aircraft are not capable of V/STOL and hover. Since the beginning of aviation history, various attempts have been made to create a heliplane, which is defined as an aircraft that combines helicopters' excellent capabilities of V/STOL and hover, with fixed wing aircraft's capabilities of flying at high speeds.

High-speed vertical takeoff and landing aircraft, particularly the tilt-wing, tilt-rotor, trail rotor, folding tilt rotor, stowed-rotor, rotor/wing, and X-wing are well known in the aerospace industry, see NASA technical reports 177578, 177585, 177590, 177592 and 177603. These concepts may be considerably different in design, yet attempt to achieve similar operational goals of vertical takeoff and landing, and high speed forward flight. Current vertical and short takeoff and landing (V/STOL) aircraft designs attempt to have both qualities: efficient hovering and high-speed forward flight. Demonstrated designs appear to be an unsatisfactory compromise between the two.

One known V/STOL aircraft, the tilt-wing, uses large oversized conventional propellers driven by engines. These engines are attached to a wing that can be tilted from the horizontal position for forward flight, and to the vertical position for vertical takeoff and landing. The tilt-rotor, such as the Bell/Boeing V-22 Osprey, behaves similarly except that only the rotors and engines tilt, not the wing. These aircraft compromise both hovering efficiency, because of high-disk-loading, and forward speed. When the rotors are tilted forward for forward flight they become inefficient impellers above about 300 miles/hour. The trail rotor and folding tilt rotor have the potential to overcome the inefficiency of the tilt rotor by having low-disc-loading during hover, and high-fixed-wing-loading during high speed flight, however, since the rotors have to be tilted forward or aft 90 degrees before the rotors are stopped in a vertical plane of rotation, these two concepts have an even more complex and lengthy conversion process than the tilt rotor.

Another concept known as the stowed-rotor behaves like a conventional helicopter for vertical takeoff and landing. For high speed forward flight the rotors are slowly stopped and stowed out of the way of the airstream to reduce drag, while a set of conventional fixed wing airfoils assume primary lift. U.S. Pat. Nos. 3,515,500 to Nachod (1968) and 4,059,247 to Prewitt (1976) show the complexity involved in stopping and folding the rotors. These aircraft have hover efficiencies approaching a helicopter, yet require the additional weight of a fixed wing since the stopped rotor does not provide any lift.

Since the current invention is a horizontally stopped/lifting heliplane, prior arts involving horizontally stopped/lifting rotor will be given special attention here. Here "horizontally stopped" means the rotor is stopped in a substantially horizontal plane of rotation, and "lifting" means the stopped rotor provides some lift from at least one blade of the rotor during at least part of the fixed wing flight. This broad definition of "lifting" is intended to not only include aircraft that gets lift from the stopped rotor, but also to include aircraft that includes a stage where the stopped rotor provide some lift, but in some other stages of the fixed wing flights the blades may not provide any lift. A major challenge in horizontally stopped/lifting rotor aircraft is related to, besides the stopping of the rotor itself, how to deal with the reverse flow problems associated with any blade in the retreating region. If a retreating blade has a typical airfoil shape with a tapered trailing edge and a rounded leading edge, after it is stopped, reverse flow from the tapered edge to the rounded edge can cause flow separation and aerodynamic problems. Known prior arts attempt to resolve the reverse flow problems of any retreating blade after stopping the rotor or rotors in one way or another but suffer various disadvantages.

U.S. Pat. No. 3,207,457 issued to Kisovec discloses an aircraft with two counter-weighted single-bladed rotors mounted at the tips of the main fixed wings. The blades are used as wing extension while the counter-weights are stowed during fixed wing flight. This invention has low figure of merit. The single-bladed rotor creates balance-of-force and oscillation problems in rotary flights due to the single-bladed rotors.

U.S. Pat. No. 3,494,707 issued to Kisovec discloses a "Rotafix" aircraft with two 2-bladed rotors mounted at the tips of the main fixed wings. The outboard blades are used as wing extension while the inboard blades are stowed at the trailing position during fixed wing flight. In order to achieve low-disc-loading during rotary flight, the rotor blades tend to be relatively long, which gives the extended wing a very high aspect ratio, excessive wing area, and a poor L/D in high speed cruise, see NASA technical report 177585. Due to the mechanical limitation in the rotor construction, this invention lacks the capabilities to place both blades of each rotor at the trailing position, which is desired in order to increase wing loading during high-speed flights. It also requires a complex mechanism to rotate the blade at the trailing position by 90 degrees about its pitch axis while keeping the outboard blade substantially horizontal.

One concept known as the stopped rotor X-wing aircraft behaves like a conventional helicopter for vertical takeoff and landing, having low-disk-loading. To achieve high-speed forward flight the four main rotor airfoils are slowly stopped and fixed in an "X" position in the horizontal plane, forming 45 degree swept wing angles (two airfoils are forward swept 45 degrees, and the other two airfoils are aft swept 45 degrees). The stopped rotor airfoils provide primary lift for forward flight, eliminating the need for additional fixed wings. Since two of the four main rotor airfoils are essentially flying backwards in the fixed wing position (relative to their rotary wing airfoil position), a complicated air circulation control system is required for each airfoil to achieve lift in both the rotary and fixed wing operation. This causes the airfoil leading edge to be identical to the trailing edge. U.S. Pat. No. 4,711,415 to J. A. Binden uses high-pressure air blown over the airfoil leading and trailing edges, via span-wise running slots, to achieve circulation control. The rotor systems research aircraft X-wing (RSRA/X-wing), based on principles of this patent, and built by Sikorsky Aircraft Corporation, was never able to demonstrate rotary wing flight or transition from rotary wing to fixed wing flight, or vise versa. Complexity and number of the mechanisms associated with main rotor airfoil circulation control, and questionable reliability of successfully transitioning between rotary wing and fixed wing flight, and vise versa, caused the program to be abandoned.

U.S. Pat. No. 5,405,104 "Stopped Rotor Aircraft Utilizing a Flipped Airfoil X-Wing" issued to J. B. Pande discloses an aircraft having a 4-blade rotor. During the rotary wing flight the blades are operated like a conventional helicopter. The four blades are stopped to serve as fixed wings for high-speed flight. During transition to fixed wing flight two adjacent blades are flipped 180 degrees about their pitch axis such that all blades have leading edges in the correct orientation for a particular flight mode. This invention has the disadvantage of structural and control difficulties associated with the flipping of blades. During the flipping of blades, the blades have to go through a vertical position where the cross section area exposed to the airstream is maximized, causing a tremendous aerodynamic drag. Although the spike of drag only lasts for a short period of time, it is enough to cause structural and yaw control stability issues.

U.S. Pat. No. 5,454,530 "Canard Rotor/Wing" issued to J. W. Rutherford et al is an inventive aircraft utilizing a jet-propelled rotor/wing, preferably having two blades, to achieve V/STOL and hover when the aircraft is in the helicopter mode. During the transition from the helicopter mode to fixed wing airplane mode, the aircraft utilizes its canards and horizontal tail to generate substantially all of the lift so that the rotating rotor/wing can be unloaded. Afterwards, the rotating speed of the rotor/wing is slowed down and eventually stopped and locked to function as the left and right wings. When flying in fixed wing airplane mode, the rotor/wing can operate like an oblique wing to maximize flight efficiency at different speeds. This invention has a disadvantage of high drag and low lift efficiency. The leading edge of the retreating blade becomes the trailing edge after stopping. In order for the retreating blade to avoid flow separation problems due to reverse flow after stopping, the blade airfoil cannot adopt the most efficient shape of a typical airfoil, and instead has to be compromised to adopt the less efficient shape with a rounded trailing edge identical to the leading edge, which leads to high drag and low lift efficiency in both rotary wing mode and fixed wing mode. Typical airfoils for subsonic flights have a characteristic shape with a rounded leading edge, followed by a tapered (sharp) trailing edge to reduce drag. In addition, the collective pitch control is further complicated due to the fact that the retreating blade's leading and trailing edges switch positions after stopping.

U.S. Pat. No. 2,879,013 "Convertible Aircraft" issued to G. P. Herrick is an invention utilizing a straight rotor/wing and a straight fixed wing. In the helicopter mode, the straight rotor/wing rotates like a two-blade rotor. In the airplane mode, the rotor/wing is stopped and together with the fixed wing, forming a configuration similar to a biplane. The two straight wings limit the efficiency in high-speed flights due to drag divergence. For the same reason as in the CRW, the rotor/wing has to adopt an airfoil cross section with a trailing edge substantially identical to the leading edge, which increases drag in both flight modes.

U.S. Pat. No. 3,327,969 "Convertible Aircraft" issued to R. E. Head invents an aircraft utilizing a jet-propelled rotor/wing. In the helicopter mode, the rotor/wing rotates and generates lift with three stub blades installed on a large center body of the rotor/wing. The large center body was sized to provide the necessary lift during conversion to fixed-wing flight as the rotor slowed and stopped rotating. At airplane mode, the center body and two of the three stub blades generate lift for the aircraft. This invention has a disadvantage of low flying efficiency and low lift efficiency. The centerbody has poor L/D ratio. In helicopter mode, the relatively small and low aspect ratio stub blades are not efficient in generating lift, therefore requiring high induced power to generate the necessary lift. In the fixed wing airplane mode, the large centerbody creates large drag force. For the same reason as in the CRW, the two lifting stub blades has to adopt an airfoil cross section with a trailing edge substantially identical to the leading edge, which increases drag in both flight modes.

U.S. Pat. No. 7,014,142 "Low-Drag Rotor/Wing Flap" issued to Barocela et al. discloses an inventive blade having a body portion and a flap portion. The flap is movably coupled to the body portion. The movable flap enables the blade edge where the flap is attached to transform between a rounded leading edge and a tapered trailing edge. This invention acknowledges the high drag and low lift efficiency associated with the rounded trailing edge in "Canard Rotor/Wing", and attempts to resolve the reverse flow problems of the retreating blades by using at least one movable flap. This invention has a disadvantage of complexity, as well as the disadvantages of structural and control difficulties associated with flipping the flaps. In order to gain the benefits of reduced drag during both rotary and fixed wing modes, both edges of at least one blade have to be equipped with flaps. The movable flaps require extra mechanical devices to provide power and control during the conversion between the two flight modes. During the conversion only one of the two blades has to transform the leading edge into the trailing edge and vice versa. The flaps on that blade have to be swung 180 degrees from one horizontal position to vertical position and then to the opposite horizontal position. Flipping the flaps creates similar structural and yaw control difficulties as flipping the blades in U.S. Pat. No. 5,405,104. When the flaps are at their vertical position, the drag force created by oncoming airstream is significant if the blade under conversion is at the transverse position relative to the fuselage. One possible way to overcome the problems is to perform the flipping when the blade is pointing in the longitudinal direction of the fuselage rather than in the transverse direction. After the transformation of the one blade, the stopped rotor can be rotated to the generally transverse position to act as a fixed wing. However, this process increases the complexity of the motor locator control, and lengthens the duration of the conversion between the rotary wing mode and fixed wing mode. The duration of conversion is critical when the fixed wing needs to be quickly transformed back to the rotary wing, for example, in case of engine failure.

What is needed, therefore, is an aerial vehicle which successfully combines V/STOL, hover and low speed capabilities of a helicopter, and the high-speed flight capability of a fixed wing aircraft, is capable of smoothly, efficiently, and safely converting from one flight mode to another, and is capable of using the most efficient airfoils for rotor/wing to reduce drag and improve flying efficiency.

All helipanes utilizing horizontally stopped/lifting rotor must face the reverse flow problems associated with any blade in the retreating region. Known prior arts attempt to resolve the problems using one or more of the following methods, but suffer various disadvantages: 1) use two counter-weighted single-bladed rotors, stow the counter weights and use the single blades as wing extensions; 2) use dual 2-bladed rotors, stow away the inboard and retreating blades, and use the outboard blades as wing extensions; 3) make the blade airfoil reversible, which means the airfoil's leading and trailing edges are identical; 4) use circulation control; 5) flip any retreating blade; 6) flip flaps on any retreating blade.

All of the above-mentioned prior art references are hereby incorporated by reference in full.

The current invention resolves the reverse flow problems of any retreating blade by using two side-by-side counter-rotating rotors, a unique rotor design allowing the angular spacing of the blades of each rotor to be variable in flight, and an innovative "segregated X-wing" blade configuration to provide lift. The side-by-side dual rotor arrangement is sometimes called "transverse array", or "transverse" dual rotors. The side-by-side dual rotors arrangement includes two configurations: non-intermeshing and intermeshing.

The above mentioned and other objects, features, and advantages of the invention and the manner of obtaining them will become apparent, and the invention itself will be best understood, by reference to the following description taken in conjunction with the accompanying illustrative drawings.

SUMMARY OF THE INVENTION

The present invention teaches certain benefits in construction and use which give rise to the objectives described below.

The present invention provides a rotor for use on an aircraft. The rotor includes a plurality (N) of rotor blades, each having a rounded leading edge and a tapered trailing edge to reduce drag and improve lift efficiency; a plurality (N) of concentric masts, each for operably mounting one of the plurality of rotor blades at N different elevations; a locking element for selectively locking or unlocking the concentric masts together in a plane of rotation, enabling the angle between any two rotor blades to be variable from 0-360 degrees during flight; a feathering hinge attached to each blade for changing the pitch of each blade with respect to the plane of rotation; and a pitch control mechanism operably attached to the feathering hinges of the blades for controlling the pitches of the blades collectively.

A primary objective of the present invention is to provide a rotor for use on an aircraft, the rotor and aircraft having advantages not taught by the prior art.

Another objective is to provide a rotor and aircraft that includes rotor blades mounted on concentric masts, each rotor blade being mounted at a different height, so that the angle between any two rotor blades to be variable from 0-360 degrees during flight.

A further objective is to provide a rotor that may be adjusted during flight so that all of the rotor blades are in a trailing configuration, or are otherwise positioned so that the rounded leading edges and the tapered trailing edges of the rotor blades do not disrupt the flight of the aircraft.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 4 is a top plan view of the aircraft shown in FIG. 1, illustrating the "segregated X-wing" all-lifting configuration;

FIG. 5 is a top plan view of the aircraft shown in FIG. 1, illustrating the "part lifting, part trailing" blade configuration;

DETAILED DESCRIPTION OF THE INVENTION

Figure 1:
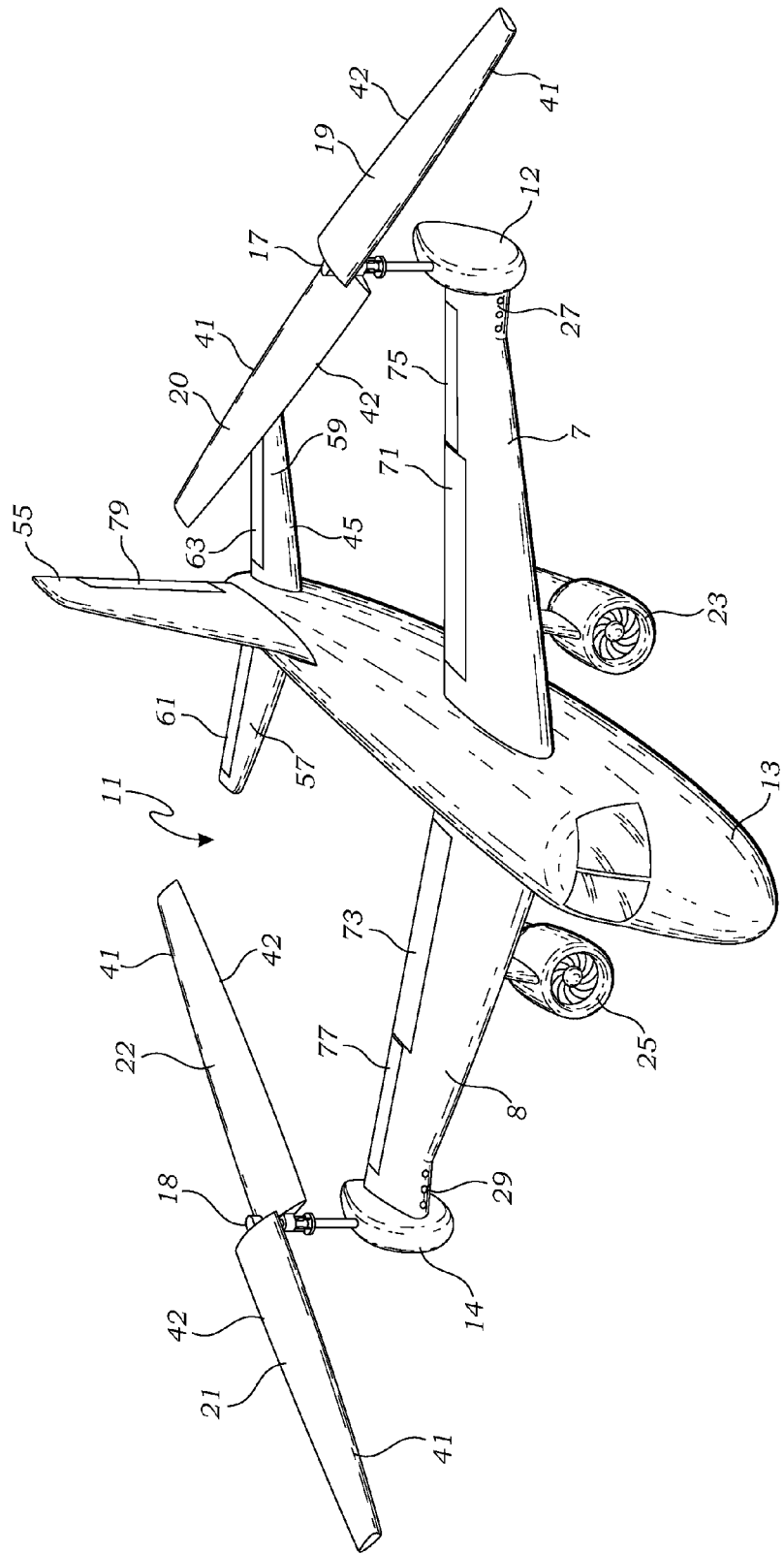
FIG. 1 is a perspective diagrammatic view of one embodiment of a non-intermeshing dual mode aircraft constructed in accordance with the teachings of this invention.

FIG. 1 shows a dual mode aircraft 11 incorporating two counter-rotating non-intermeshing rotors, capable of flight in both rotary wing and fixed wing configurations. The aircraft 11 includes a fuselage 13, two main fixed wings 7, 8 on the left and right side of the fuselage. The fixed wings incorporate an aft sweep of 20 degrees to delay drag divergence and meet the cruise speed requirement of 450 KTAS. The chord extensions at the wing tips allow the rotor tilt axis to fall within the wing planform. Without the extensions, the desired rotor tilt axis locates in front of the wing leading edge at the tip due to the difference between the ideal locations of hover CG (center of gravity) and high-speed cruise CG. Fixed wing 7 comprises a flap 71 and an aileron 75 located at its trailing edge. Fixed wing 8 comprises a flap 73 and an aileron 77 located at its trailing edge.

Figure 9:
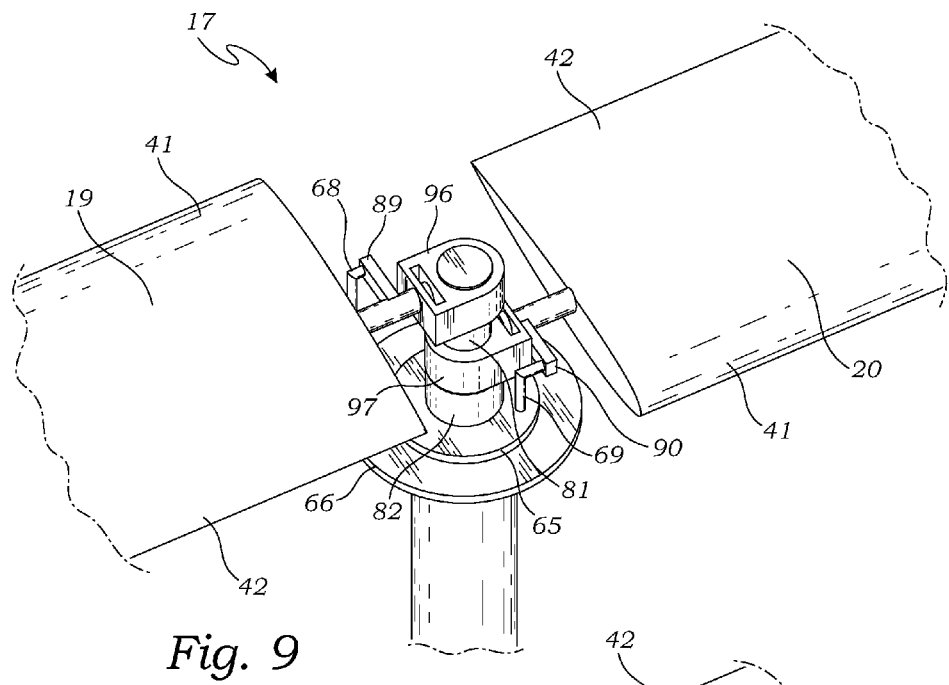
FIG. 9 is a perspective view of one embodiment of the rotor assembly in accordance with the teachings of this invention, illustrating 180 degrees between the two blades, the preferred configuration for rotary mode flight.
Figure 10:
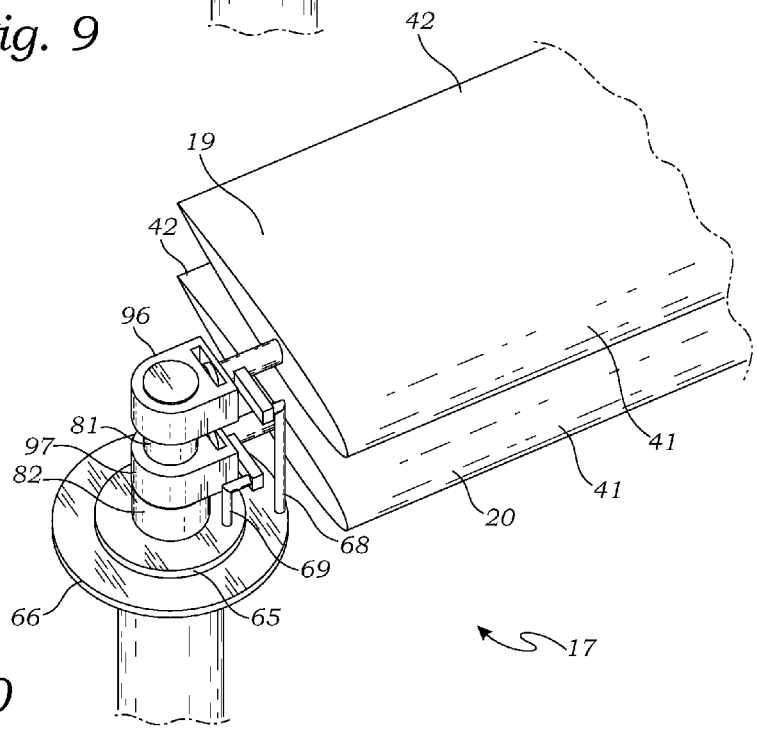
FIG. 10 is a perspective view of the rotor assembly in FIG. 9, illustrating an angle of zero degree between the two blades, one possible configuration for fixed wing flight.
Figure 11:
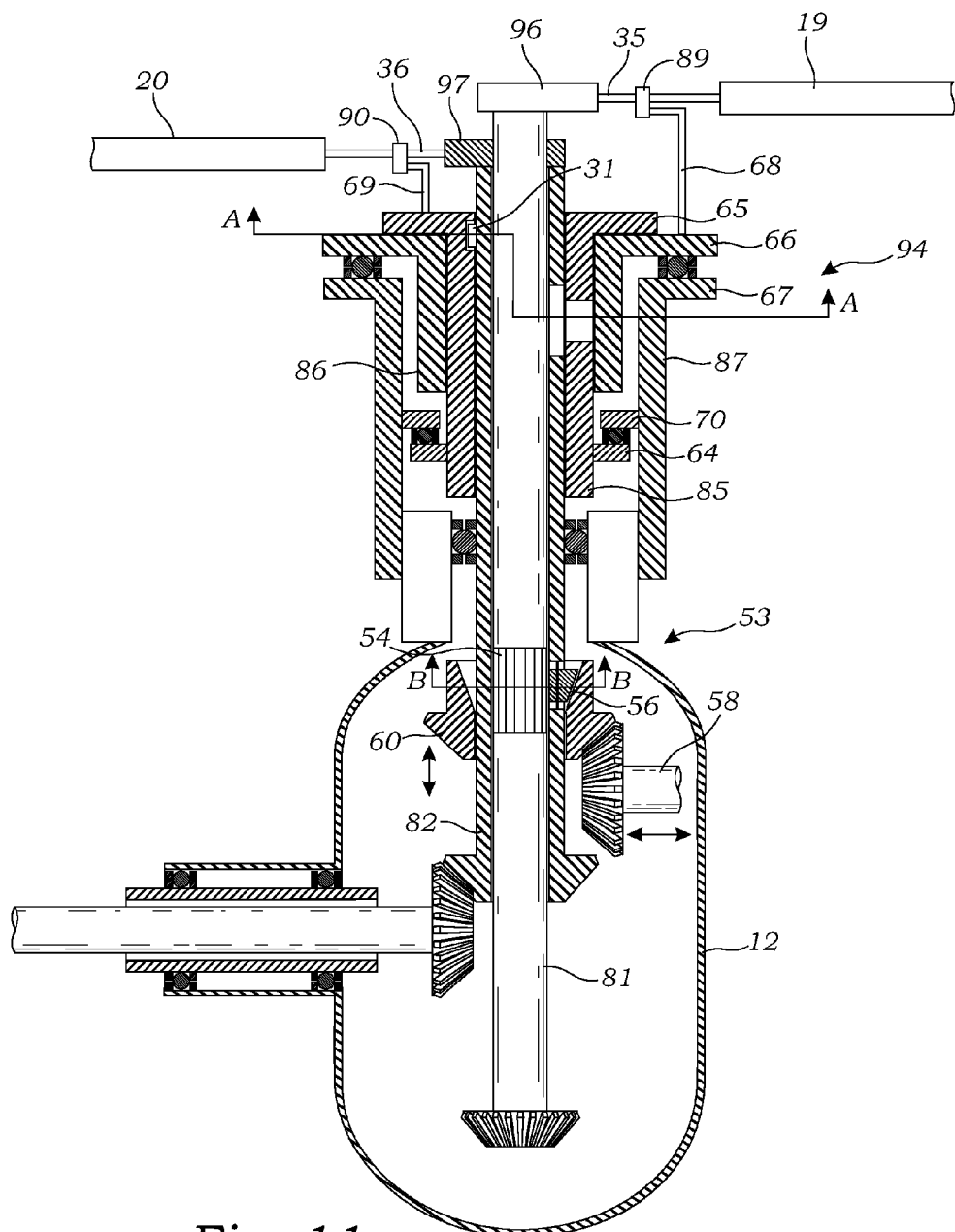
FIG. 11 is a partial cross-sectional elevation view of the rotor assembly in FIG. 9, not drawn to scale.

At the tips of the fixed wings are mounted rotors 17 and 18, respectively. Rotor 17 comprises two blades 19, 20 and two concentric masts 81, 82, see as shown in FIGS. 9, 10 and 11. Blade 19 is attached to the inner mast 81. Blade 20 is attached to the outer mast 82. Rotor 18 comprises two blades 21, 22 and two concentric masts 83, 84. Blade 21 is attached to inner mast 83. Blade 22 is attached to outer mast 84.

Figure 6:
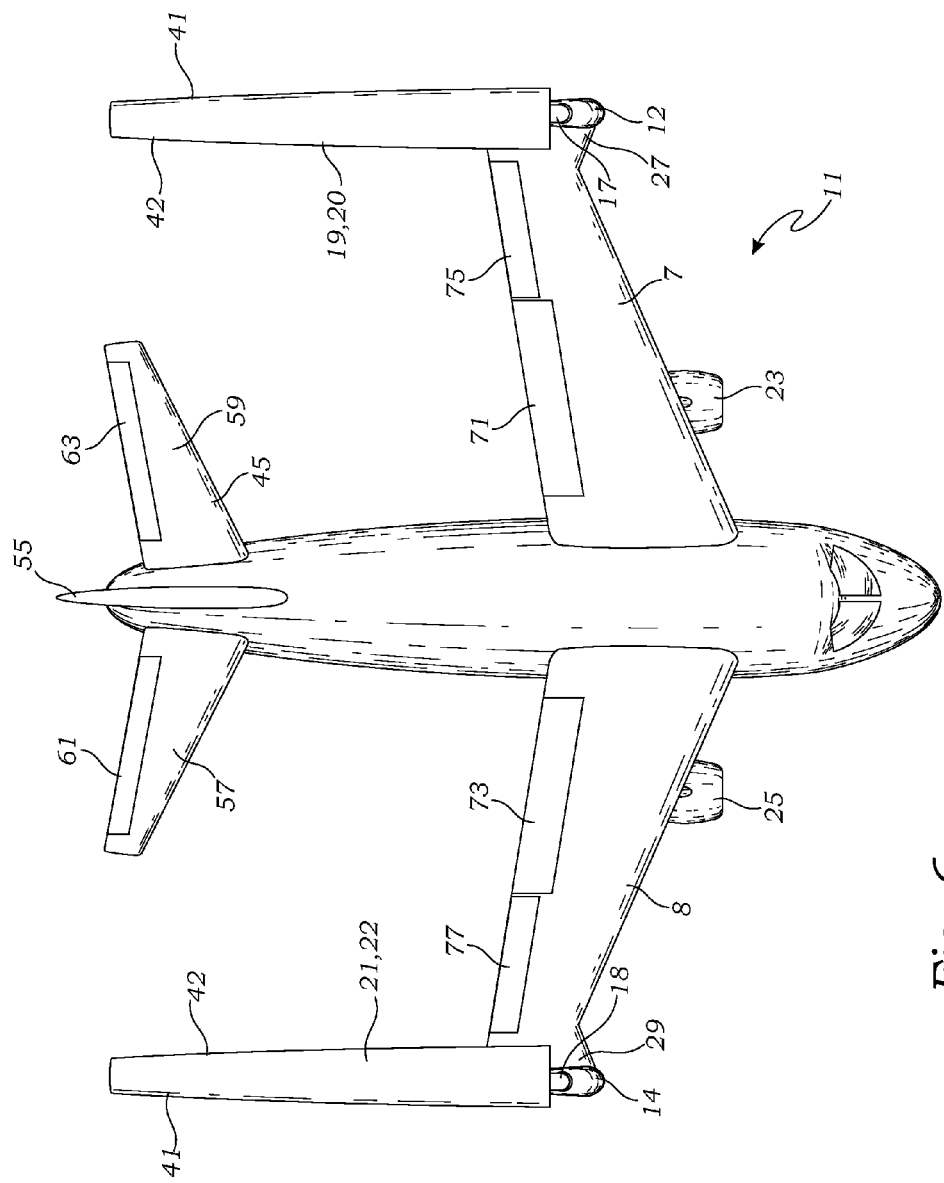
FIG. 6 is a top plan view of the aircraft shown in FIG. 1, illustrating the "all trailing" blade configuration.

The blades of a rotor are mounted at different elevations so that when all blades of a rotor are positioned to functions as fixed wings, the oncoming airstream can impinge on the leading edges 41 of all blades without blockage from any blade positioned upstream, see FIG. 4. Blade 19 is mounted at a higher elevation than blade 20. Blade 21 is mounted at a higher elevation than blade 22. Mounting the blades of a rotor at different elevations also allows the angle between the two blades to be reduced to zero so that the upper blade is on top of the lower blade, see FIGS. 6 and 10. This is very useful when it is desired to stow both blades of each rotor at the trailing position when excessive lifting area is not desired.

Blades 19, 20, 21, and 22 have rounded leading edges 41 and tapered trailing edges 42, permitting the rotors/wings 17 and 18 to operate effectively to generate lift and reduce drag.

Figure 3:
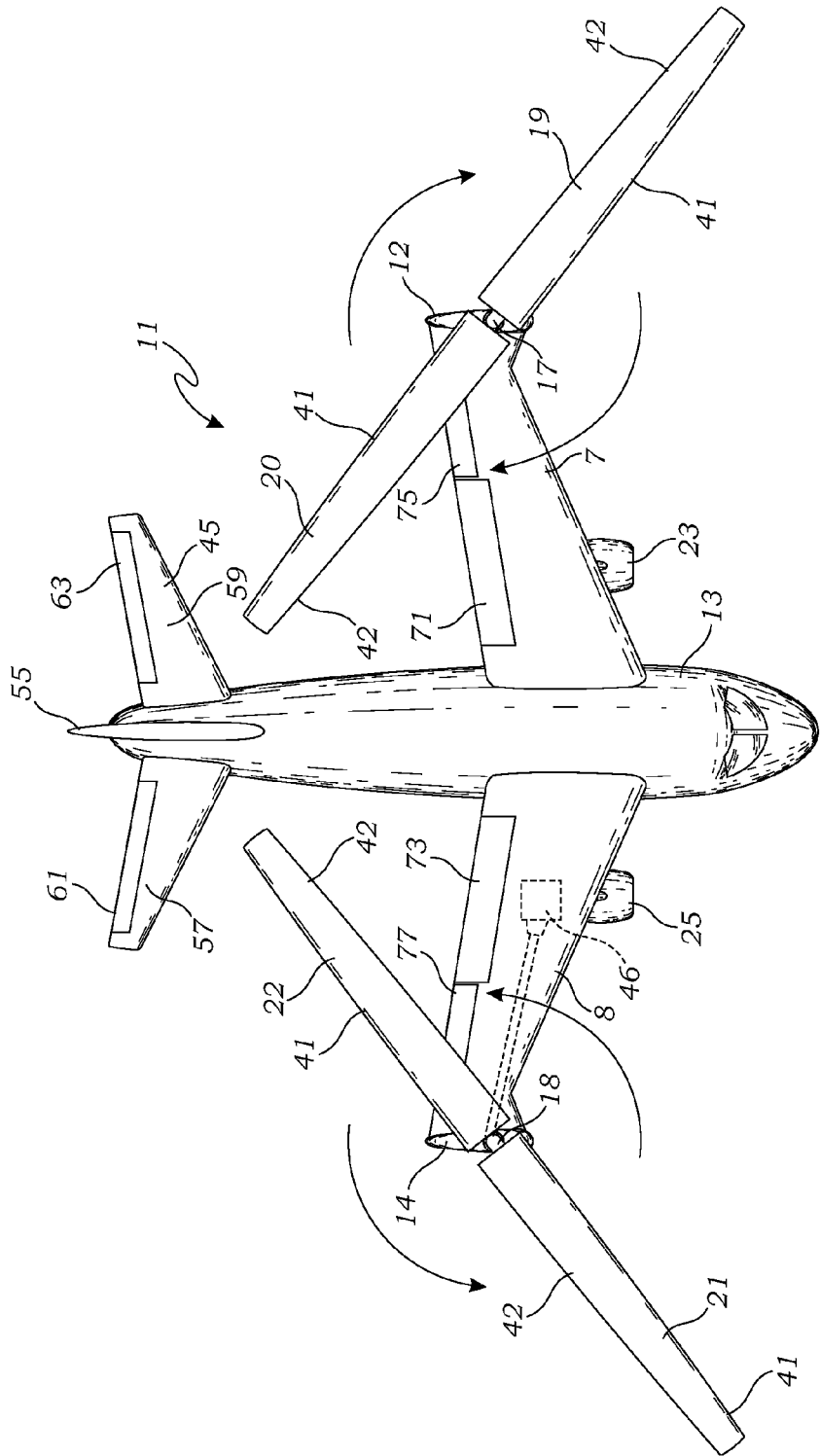
FIG. 3 is a top plan view of the aircraft shown in FIG. 1.

The aircraft is powered by two convertible turbofan engines 23 and 25. If so desired, engine 23 can provide power to rotor 17, which rotates the blades 19 and 20. If so desired, engine 25 can provide power to rotor 18, which rotates blades 21 and 22 in the counter-rotating direction. By using a proper transmission 46, if one engine fails, the other engine can be used to power both rotors. Such transmissions are common in prior art such as the V-22 Osprey and therefore not discussed in details here. In the preferred embodiment, blades 19 and 20 rotate in the clockwise direction when viewed from the top, while blades 21 and 22 rotate in the opposite direction during rotary flight, see FIG. 3. This arrangement allows the blade advancing regions to be further away from the fuselage, and the blade retreating regions to be closer to the fuselage.

Figure 7:
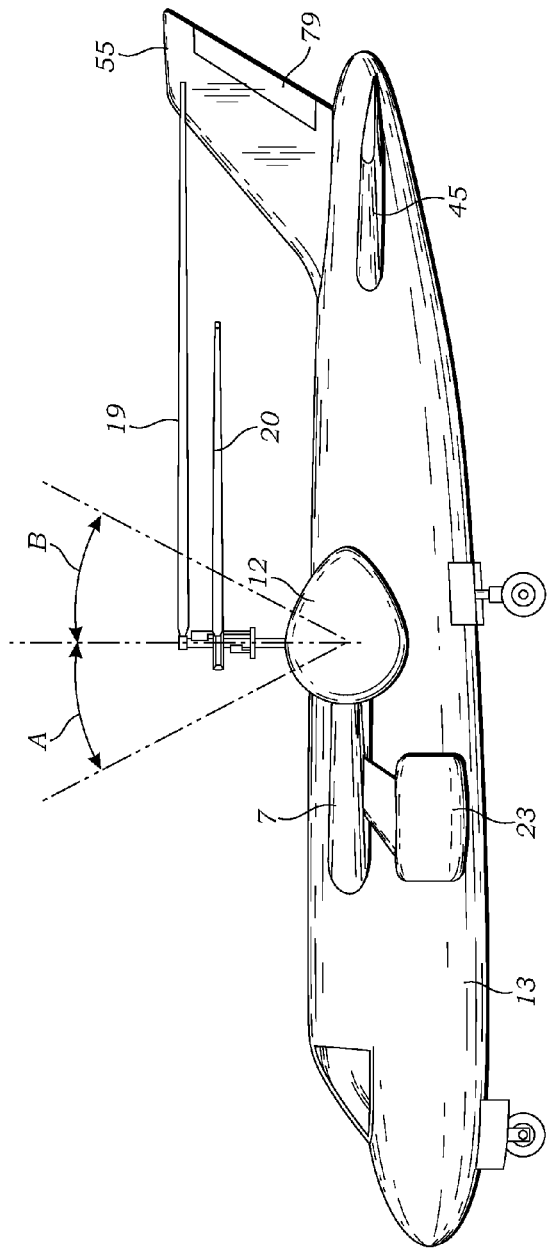
FIG. 7 is a side elevation view of the aircraft shown in FIG. 1, illustrating the rotor configuration of FIG. 5.
Figure 8:
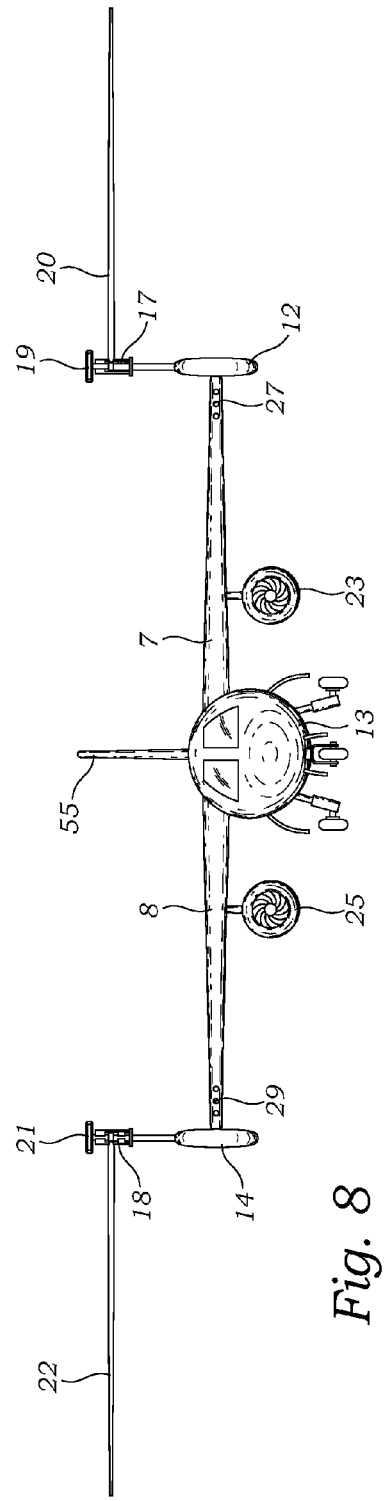
FIG. 8 is a front elevation view of the aircraft shown in FIG. 1, illustrating the rotor configuration of FIG. 5.

Referring to FIG. 11, Rotor enclosures 12, 14 contain the transmission gears, and the lower portions of the rotor masts, and other mechanisms required for control and conversion. Referring back to FIG. 1, rotor enclosure 12 is rotatably attached to the tip of wing 7 while rotor enclosure 14 is rotatably attached to the tip of wing 8, allowing the normally vertical axes of the rotors 17, 18 to tilt forward and aft (see FIG. 7) about a tilt axis located in a horizontal plane, said tilt axis being transverse to the longitudinal axis of the fuselage.

The tilting feature of the rotors is somewhat similar to that of a tilt rotor aircraft, which typically has a tilting range of about 90 degrees, but the range of tilt in the current invention is significantly reduced since it does not need to tilt the rotors all the way to horizontal to provide forward propulsion. The tilt range of the current invention is preferably +/−22.5 degrees forward and aft, a total of 45 degrees, see FIG. 7. The rotation axes of the rotors remain substantially vertical during both hover and high-speed flights. This reduction in the range of tilt angle has significant impact on the design and operation of the aircraft. It significantly reduces the complexity of operation and the duration of conversion between the rotary wing mode and the fixed wing mode.

Additionally, feathering hinges 35, 36, 37, 38 permit changing of the pitch of each rotor blade 19, 20, 21, 22, respectively, as with a conventional helicopter. The rotor controls further comprise mechanisms for collective pitch control. The tilting degree of freedom of the rotors 17, 18 and the collective pitch control of the blades provide control of the aircraft in rotary flight. In the embodiment in FIG. 1, the cyclic control seen on conventional helicopter rotors is eliminated. The functions of the cyclic control are achieved with the tilting degree of freedom of the rotors 17, 18, and the collective pitch control of rotors 17, 18. The collective pitch of rotor 17 may be different from that of rotor 18, which is called differential collective control. Conventional helicopter cyclic control causes the pitch of each blade to vary according to where the blade is in the plane of rotation. The pitch of each blade changes within every revolution therefore increases the wear and tear. The elimination of the cyclic control in the current invention allows the swashplates of the current aircraft to be simplified, which leads to enhanced robustness and reliability and reduced maintenance. Since many helicopter pilots are familiar with the cyclic control stick, it is possible for this aircraft to have a "simulated cyclic control stick" which allows the pilot to control the aircraft with the look and feel of a conventional helicopter cyclic stick but the input from the stick is used to control the tilting of the rotors 17, 18 and the changing of collective pitches of the blades to accomplish the same functions of the cyclic control.

On an alternative design, thrusters located at the left and right sides of the aft part of the fuselage can be used for yaw control during hover and vertical flights, and the tilting degree of freedom of the rotors can be eliminated. On yet another alternative design, the cyclic control could be implemented for the rotors 17, 18, and the tilting degree of freedom of the rotors can be eliminated, which simplifies the rotor control and has the potential to save weight. This alternative design increases the complexity of the swashplate design, which, in addition to all the functions required by a conventional helicopter swashplate, requires extra mechanism to allow the angular spacing of the blades to be re-configurable/variable in flight. This alternative design is not discussed in details here. However the current invention is not meant to be limited by one embodiment or another, except by the scope of the claims.

The aircraft employs a horizontal tail 45 for controlling flight in the fixed wing configuration. The horizontal tail 45 is conventional with respect to other fixed wing aircraft, and includes a vertical tail portion 55 as well as two horizontal flight surfaces 57 and 59 extending from each side of the fuselage 13, rearwardly of fixed wings 8 and 7. Each of the flight surfaces 57 and 59 includes a high lift flaperon 61 and 63, respectively.

The engines 23, 25 are installed under the main fixed wings 7 and 8, respectively. During hover and vertical flights, the power of engines is primarily extracted to power the rotors. U.S. Pat. No. 4,651,521 discloses a convertible turbofan/turboshaft engine that can distribute 0-100% of the engine power between the shaft power and thrust at any split. However a reliable and economical design of this engine may or may not be available commercially today, according to the limited knowledge of the authors. Depending on the design of the best engine available today, there may be still some residual horizontal thrust from the exhaust gas even when the engine is operated to allow extraction of the maximum amount of shaft power. To minimize the effects of this undesired residual horizontal thrust during hover and vertical flight, flaps 71 and 73 are turned substantially downward thereby directing the exhaust gas from engines 23 and 25 substantially downward to produce vertical lift. This technique is often described as "externally blown flap". Turning the flaps down also helps alleviate the problem of hover download, where the downwash from the rotors 17, 18 during hover splashes on the fixed wings 7, 8. The externally blown flap alone may not be sufficient to neutralize the horizontal thrust, and therefore some other mechanisms may be necessary for refined control. Part of the engine exhaust can be ducted to nozzles 27, 29 located on the leading edge of the fixed wings 7, 8 to exit forward to help neutralize the residual horizontal thrust. Alternatively, a device similar to a thrust reverser but modified (exhaust gas partly exiting rearward in the center, partly diverted forward) to generate zero thrust can be used to neutralize the residual horizontal thrust during hover and vertical flight. Yet another alternative method to neutralize the undesired forward horizontal thrust to is tilt rotors 17, 18 backward slightly to produce a horizontal thrust component that tends to push the aircraft to flight backward, therefore canceling out the residual forward thrust from the engine exhaust. Yet another alternative to eliminate the residual horizontal thrust is to mount the engines on both sides of the fuselage, and allow the engines to tilt from vertical to horizontal positions. Yet another alternative method is to use a third engine, preferably of turbo-shaft type, to power the rotors during V/STOL and hover, and use turbofan engines 23, 25 to provide forward thrust during the fixed wing flight. Yet another alternative method is to use thrust vectoring engines to eliminate the horizontal thrust during hover.

If vertical takeoff and hover is not required, the residual horizontal thrust from the engine exhaust does not require neutralization or elimination, and the current invention can be simplified to a STOVL (short takeoff and vertical landing) aircraft or a STOL (short takeoff and landing) aircraft. The STOVL or STOL aircraft design from such simplification is within the spirit of the current invention and shall be covered by the current invention.

The engines shown in FIG. 1 are of convertible turbofan type in the preferred embodiment, and the thrusts are generated by engine exhaust flowing aft. However, any jet engine capable of producing both thrust and shaft power will achieve substantially the same functionalities. Furthermore, any shaft engine such as turboprop engine, or electric motor, will achieve substantially the same functionalities in terms of vertical and horizontal propulsion. When at least one turboprop engine or at least one electric motor is used instead of engines 23, 25, at least one propeller will be used to produce thrust. During hover and vertical flight, said at least one propeller will be simply disengaged from the engine or motor power and there is no residual horizontal thrust to deal with.

Figure 2:
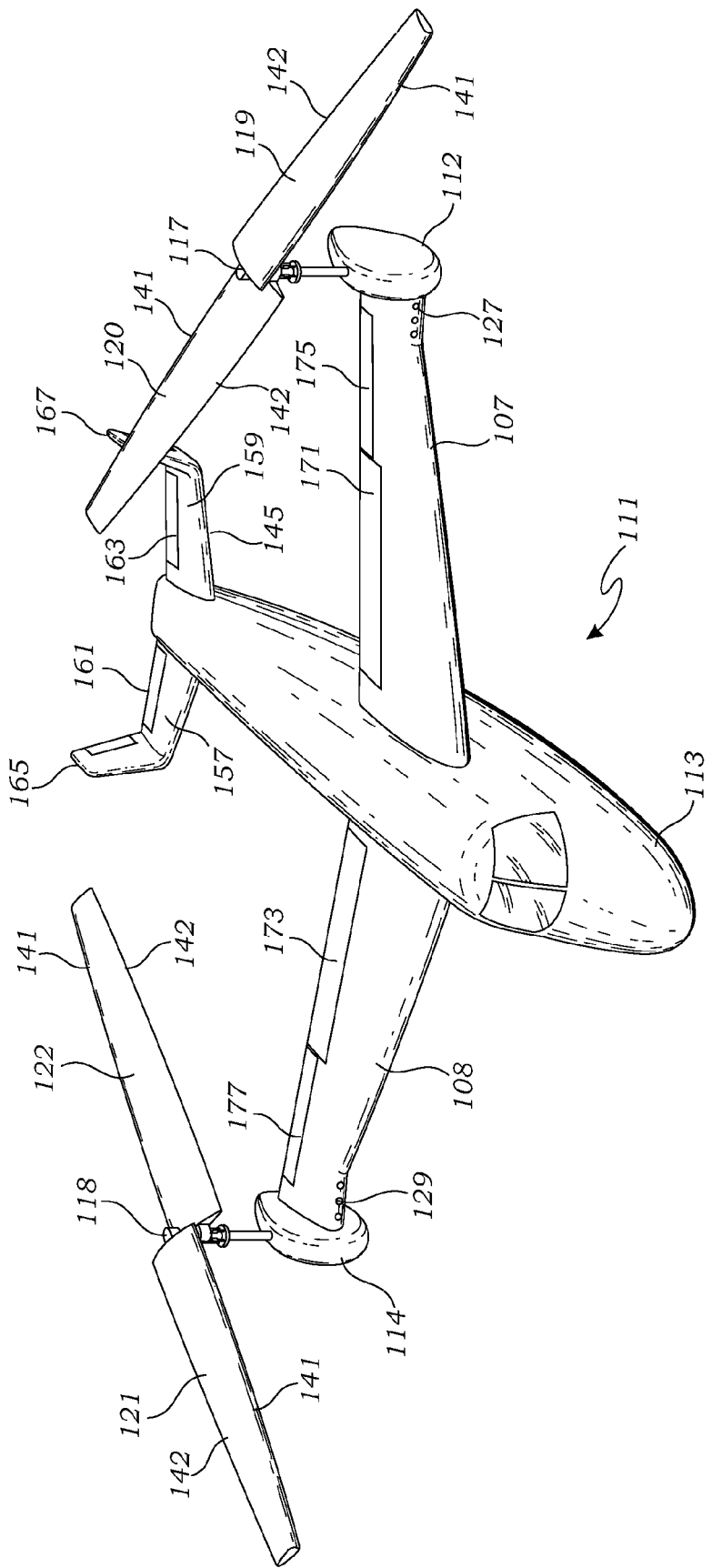
FIG. 2 is a perspective view of a modified embodiment of the non-intermeshing dual mode aircraft.

FIG. 2 show a modified embodiment of the aircraft shown in FIG. 1, which is identical in all respects with that of FIG. 1 except as described and shown herein. Each of the elements in FIG. 2 corresponding to equivalent elements in FIG. 1 is designated by the same reference numeral, preceded by the numeral 1. This modified embodiment is designed to use a single engine while the FIG. 1 embodiment is designed to use two engines. The vertical tail portion 55 of FIG. 1 was eliminated. Instead, generally vertical portions 165 and 167 are incorporated on the ends of the horizontal tail element 145.

Both of the aircraft embodiments shown in FIGS. 1 and 2 operate substantially identically, and the description provided below is equally applicable to either embodiment, though for the sake of simplicity only the FIG. 1 reference numerals will be identified. Though there may be one or two engines used, the discussions will be based on two engines and it is equally applicable to the single engine version with exceptions and differences commonly known in the arts.

The aircraft can be operated like a helicopter, a gyroplane or a fixed wing aircraft. Both helicopter mode and gyroplane mode belong to the rotary wing mode. During rotary wing mode, the blades 19, 20 are substantially evenly spaced within 360 degrees, which means the blades are 180 degrees apart.

For hovering and vertical flight the aircraft of the current invention is operated in a helicopter mode during which the engines power the rotors. In the helicopter mode, the engines 23, 25 power the rotation of the blades 19, 20 about the common axis of masts 81, 82, and the rotation of blades 21, 22 about the common axis of masts 83, 84. Ascending and descending is controlled by applying the same collective pitch control to rotors 17 and 18. During hover and vertical flight, the aircraft's yaw control is primarily achieved through tilting the rotors 17 and 18 in opposite direction, one forward and the other aft. Roll control is primarily achieved by differential collective control, which means applying different collective pitch control to rotors 17 and 18. When the aircraft reaches a suitable altitude, appropriate control adjustments are made to begin translational (horizontal) rotary flight. Alternatively, the aircraft may continue to hover like a helicopter indefinitely.

After take-off, the aircraft can fly translationally at relatively low speeds, either in helicopter mode or gyroplane mode. Opinions differ on the relative advantages of helicopters vs. gyroplanes. The authors of the current invention believe in the enhanced safety of the gyroplanes, therefore as soon as flight conditions such as airspeed permits, the aircraft should transition into a gyroplane mode for rotary wing flight, where engine power are diverted from the rotors to generate forward thrust and the rotors are set to auto-rotate. Gyroplane mode also fits in well since during the transition to fixed wing mode the rotors are supposed to be free from lift requirements and therefore free from engine power. The sequence of conversion from takeoff to high-speed flight is: 1) helicopter mode for V/STOL and hover; 2) compound helicopter; 3) gyroplane; 4) fixed wing aircraft.

The aircraft continues to increase its speed in gyroplane mode, and reaches a suitable conversion speed. At this speed, the main fixed wings 7, 8 and the horizontal tail 45 assume the lift requirements of the aircraft. The rotation axes of rotors 17, 18 are gradually restored to their normally vertical positions, and the pitch of blades 19, 20, 21, 22 is gradually flattened to minimize lift, and the rotation speed of rotors 17, 18 are gradually slowed down by damping devices. At the conversion speed, the rotors 17, 18 are completely unloaded and free from lift requirement. Then the tilting degree of freedom of rotor hubs 15 and 16 are locked, rotors 17, 18 completely stopped, the ratcheting gear between masts 81, 82 is set so that the angle between blades 19 and 20 can be reduced, the ratcheting gear between masts 83, 84 is set so that the angle between blades 21 and 22 can be reduced, and the blades of each rotor are then rotated about the common axis of the rotor masts and re-positioned within a no more than 135-degree section where blade advancing occurs, to function as a fixed wing, or positioned at the trailing position. The 135-degree section includes 45 forward sweep and 90 aft sweep. The blades can be positioned anywhere within this 135-degree section. At relatively low speeds, both blades of each rotor can be positioned to function as fixed wings. One example is to have blades 20, 22 sweep forward at 45 degrees, and have blades 19, 21 sweep back at 45 degrees, see FIG. 4. This blade configuration somewhat resembles the X-wing aircraft in U.S. Pat. No. 4,711,415, and the flipped airfoil X-wing aircraft in U.S. Pat. No. 5,405,104, and can be used to illustrate one of the various advantages of the current invention: the current invention does not have to use airfoils with a rounded trailing edge identical to the leading edge as in X-wing aircraft, nor does it require flipping of any blade or flaps as in flipped airfoil X-wing aircraft, and yet all blades can provide lift without any reverse flow problem since no blade is in the blade retreating region. In addition, unlike CRW or U.S. Pat. No. 3,327,969, the current invention has the advantage of a simplified blade pitch control. It does not have to reverse the direction for the retreating blade after transition from rotary mode to fixed wing mode. The configuration in FIG. 4 is referred to as the "segregated X-wing" configuration since it resembles a "X-wing" separated vertically at the center with space inserted in between. This configuration is useful during low speed fixed wing flights to increase lift area and decrease stall speed. This configuration has a particularly useful and novel counter-part with the intermeshing rotor arrangement, which will be further discussed later.

As the speed of the aircraft increases, excessive lifting area is not desired; blades 19, 21 can be swept back to the trailing positions, while blades 20, 22 can be swept back to a 20-degree aft sweep, which resembles wing extensions for the main fixed wings 7, 8 when viewed from the top, see FIG. 5. This configuration somewhat resembles the "Rotafix" aircraft's wing configuration in U.S. Pat. No. 3,494,707, but the current inventive aircraft does not require rotating the blades at the trailing positions by 90 degree, thus simplifying the operation and mechanical design. Due to the rotor design, the Rotafix aircraft does not have the capability to stow both blades of each rotor at the trailing position which is desired as the air speed increases, while the current invention has the capability to do so.

As the speed of the aircraft continues to increase and reaches a relatively high value, further reduction of lifting area is desired. Blades 20, 22 are continuously swept back, and eventually positioned at the trailing positions as blades 19, 21 are, see FIG. 6. Since blade 19 is mounted at a higher elevation from blade 20, in this configuration the blades will be "stacked up" with blade 19 on top of blade 20. Similarly blades 21, 22 are stacked up at the trailing position. Placing all blades at the trailing positions increases the fixed wing loading, which is desired for high-speed flights. All these aforementioned possible blade configurations (in FIGS. 4-6) demonstrate the flexibility of the current inventive non-intermeshing aircraft.

In fixed wing flight, roll control is achieved by directing ailerons 75, 77 on the fixed wings 7, 8 in opposite directions, and flaperons 61, 63 on the horizontal tail 45 in opposite directions. Yaw control is achieved by rudder 79 and the differential thrusts from engines 23, 25. And the attitude of the aircraft is controlled by turning flaperons 61, 63 on the horizontal tail in the same direction, either up or down.

In fixed wing flight, the cruise lift is shared among the main fixed wings 7 and 8, the horizontal tail 45, and possibly blades from rotors 17, 18 depending on air speed, to minimize induced drag. The airfoils with rounded leading edge 41 and tapered trailing edge 42 on rotors 17, 18 further improves the cruise efficiency of this configuration.

The conversion from fixed wing mode to rotary wing mode generally follows the reverse sequences, which are not discussed in details here. One noteworthy safety feature of the current inventive aircraft is its ability to quickly convert from fixed wing mode back to rotary wing mode for safe landing during an engine power failure. If both engines fail during fixed wing flight, the pilot will utilize the inertia of the aircraft to glide and look for a suitable landing spot. When the speed of the aircraft is reduced to a suitable value, an emergency conversion procedure is followed. The emergency conversion procedure is relatively simple and can be performed rapidly. First, the ratcheting gears are set so that the angle between blades 19, 20 and the angle between blades 21, 22 can only increase. Second, the brake/stop mechanism on inner masts 81, 83 is released. Third, backup power and a motor are used to start driving the outer masts 82, 84 in their normal rotation direction during rotary flight. As outer masts 82, 84 are accelerated in angular motion, inner masts 81, 83 start to spin, driven only by friction between the inner and outer masts, and resisted by inertia of the inner masts. The difference in angular velocities between the inner and outer masts results in the increase of the angle between the two blades of each rotor, until the angle reaches 180 degrees, and then the hard stop mechanisms on the masts prevents the angle to increase any further. The hard stop mechanisms and the ratcheting gears together lock masts 81, 82 together, and lock masts 83, 84 together. The blades are now in their rotary wing configuration. Appropriate adjustments are then made to allow the rotors to auto-rotate to provide lift for safe landing.

Although mechanical transmissions are used to drive the twin rotors in the embodiments in FIGS. 1-2, an alternative method such as reaction drive is possible. Engine exhaust gas can be ducted to the blades and exit from nozzles on the edges of the blades to cause the rotors to rotate. This is a well-known art and shall not be discussed in details here.

Detailed Description of the Rotor Assembly

The capabilities and flexibilities of the non-intermeshing dual rotor aircraft in FIG. 1 are made possible by an inventive rotor. FIGS. 9-13 show an embodiment of the rotor assembly enabling the angle between the two blades of a rotor to vary between zero and 180 degrees in flight. To better illustrate how different parts fit together and function, FIG. 11 is not drawn to scale. This embodiment of the rotor assembly allows collective pitch control but does not include mechanisms for cyclic control. As mentioned earlier, the cyclic control function is not necessary since its functions are achieved by the tilting degree of freedom and collective pitch control of the pair of side-by-side rotors. Since the two rotors 17, 18 are constructed substantially identical to each other, discussions are focused on rotor 17 only and are equally applicable to rotor 18.

Rotor 17 comprises two concentric masts, namely inner mast 81 and outer mast 82, two blades 19 and 20, two rotating discs, namely inner disc 65 and outer disc 66, and a stationary disc assembly 91.

Unlike a conventional rotor assembly with a single mast, the current inventive rotor comprises two concentric masts 81, 82. In addition, the current inventive rotor does not have a rotor "hub" typically seen in conventional rotors. Blades 19, 20 are attached to masts 81, 82 through blade attachment points 96, 97 respectively. Blades 19, 20 have feathering hinges 35, 36 respectively to allow change of blade pitch. In the preferred embodiment, blade 19 is mounted at a higher elevation than blade 20 to allow an angle of zero degree between these two blades. Mounting the blades at different elevations also has aerodynamic advantages: when both blades provide lift in the blade-advancing region (see FIG. 4), the upstream blade does not block the free air stream impinging on the downstream blade.

Figure 14:
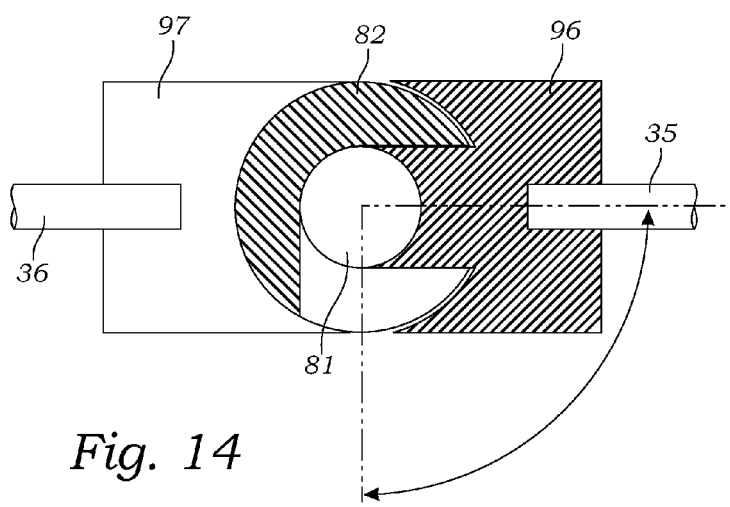
FIG. 14 is a top plan view of an alternative embodiment of the rotor attachment points, showing how the blades can be mounted at the same elevation with this configuration.

In an alternative embodiment, blade 19 and 20 can be mounted at the same elevation, if it is desirable to do so, by cutting out part of the attachment point 97 of mast 82, and allow the attachment point 96 of mast 81 to fit inside 97, see FIG. 14. In the particular embodiment in FIG. 14, attachment point 97 serves as hard stop to limit the angle between the blades to 90-180 degrees. When blades 19, 20 are mounted at the same elevation such as in FIG. 14, the angle between the two blades cannot reach zero. This alternative embodiment is a special case of the general embodiment in FIG. 11, and therefore is not discussed in details.

Referring to FIG. 11, concentric masts 81 and 82 can rotate relative to each other freely in principle; however a hard stop mechanism limits this relative rotation between 0 and 180 degrees. The hard stop mechanism comprises of metal pieces attached on masts 81 and 82 to limit the rotation of mast 81 relative to mast 82, which is well known and therefore not shown or discussed in details here. The rotor further comprises pitch control mechanism 94. Pitch control mechanism 94 comprises of concentric discs 65, 66, 67, 70 and sleeves 85, 86, 87, as well as torque tubes 68, 69. Disc 65 is attached to the top of cylindrical sleeve 85, which is concentric and in contact to mast 82. Disc 66 is attached to the top of cylindrical sleeve 86, which is concentric and in contact to sleeve 85. Disc 66 has a slightly larger diameter than disc 65 and is placed below and in contact to disc 65. Torque tube 69 is attached to the top surface of inner disc 65 on one end and attached to lever 90 of blade 20 on the other end. Torque tube 68 is attached to the top surface of outer disc 66 on one end and attached to lever 89 of blade 19 on the other end. Levers 89, 90 are fixedly attached to the feathering axes of blades 19, 20 respectively. Pushing the levers 89, 90 up and down using the torque tubes 68, 69 causes the pitches of blade 19, 20 to increase and decrease collectively.

Disc 65 and its sleeve 85 can move freely in the axial direction relative to outer mast 82. Disc 67 is attached to sleeve 87, which is attached to disc 70. Discs 67, 70 and sleeve 87 together resemble the functionality of the "stationary disc" in a conventional helicopter swashplate assembly. Therefore discs 67, 70 and sleeve 87 together are referred to as stationary disc assembly 91. Stationary disc assembly 91 can move in the axial direction of the masts freely, but it is not allowed to rotate relative to the rotor enclosure 12. When stationary disc assembly 91 is caused to move up by such mechanisms as hydraulic actuation, disc 67 pushes up against outer disc 66 through one set of bearings, which in turn pushes up against inner disc 65, and causes both levers 89 and 90 to move up, and increases the pitches of blades 19 and 20 collectively. When stationary disc assembly 91 is caused to move down, disc 70 moves down and pushes down against disc 64 through another set of bearings, which causes sleeve 85 and disc 65 to move down. Disc 65 then pushes down against disc 66, and causes both levers 89 and 90 to move down, and decrease the pitches of blades 19, 20 collectively.

In rotary mode, discs 65 and 66 rotate with blades 19 and 20, but stationary discs 67 and 70 are not allowed to rotate relative to the rotor enclosure 12. Bearings are used between discs 66 and 67, and between discs 64 and 70 to allow disc 66 to rotate freely relative to the stationary disc assembly 91.

FIG. 9 shows the blade configuration for rotary flight, where the two blades are spaced at 180 degrees apart. FIG. 10 shows one of the possible blade configurations for fixed wing flight, where the two blades are spaced at zero degree apart. FIGS. 9, 10 illustrate how the torque tubes 68, 69 and levers 89, 90 avoid collision when the angle between blade 19 and 20 are varied between 0 and 180 degrees.

Figure 12:
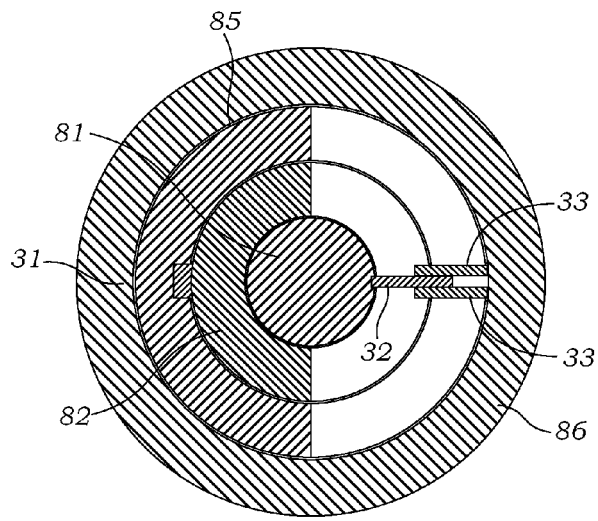
FIG. 12 is a partial cross-sectional view of the rotor assembly along line A-A showing the guide rails.
Figure 13:
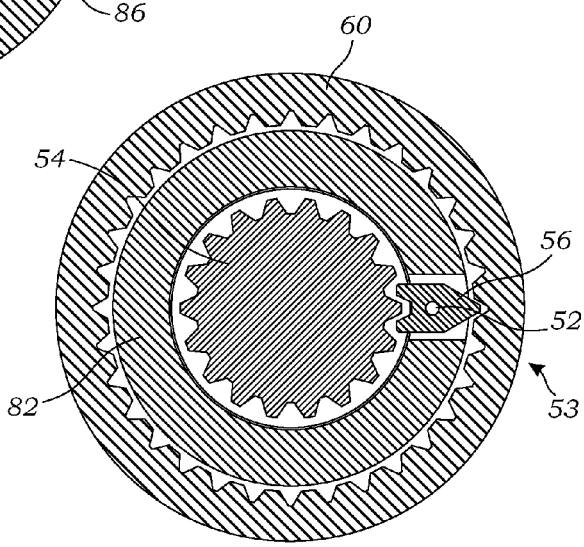
FIG. 13 is the cross sectional view of the reversible ratcheting gear from line B-B.

To ensure disc 65 rotating with the blade 20 and mast 82, sleeve 85 is slidably/movably attached to the outer mast 82 by using a guide rail 31 so that disc 65 can move freely in the vertical direction, but is fixed to mast 82 in angular motion, see FIG. 12.

To ensure disc 66 rotating with the blade 19 and mast 81, sleeve 86 is slidably/movably attached to the inner mast 81 by using a guide rail so that disc 66 can move freely in the vertical direction, but is fixed to mast 81 in angular motion. Since sleeve 86 is not in direct contact to mast 81, a preferred embodiment is to cut openings in sleeve 85 and 82 to allow a slidable/movable attachment between sleeve 86 and mast 8 lusing a guide rail mechanism comprising of parts 32, 33, see FIG. 12. The heights of the openings are determined by the desired length of vertical movement required for collective pitch control. The width of the opening should be large enough to allow the movable attachment between mast 81 and sleeve 86 to rotate 180 degrees about the common axis of the masts 81, 82.

The aircraft further includes a locking element that enables the locking and unlocking of the masts, thereby enabling the variation of the angle between the two blades of the rotor. Those skilled in the art may devise many alternative gears or other forms of locking elements or assemblies to enable this form of adjustment, and any alternative embodiment devised by one skilled in the art should be considered within the scope of the present invention. In the present embodiment, the aircraft includes a reversible ratcheting gear, illustrated in FIGS. 11-14.

In the embodiment of the rotor assembly in FIG. 11, the rotor further comprises a ratchet element 53. Ratchet element 53 comprises ratcheting gear 54, pawl 56 and pawl axis 52. Ratcheting gear 54 forms a part of mast 81. The teeth of ratcheting gear 54 can be made by machining material pieces off the cylindrical mast 81. Pawl 56 has two teeth and is movably attached to mast 82 through an opening on mast 82. The opening on mast 82 gives space to contain pawl 56 and allows pawl 56 to contact ratcheting gear 54 and limit the rotation of mast 81 relative to mast 82 to a selected single direction, depending on which pawl tooth is in contact with gear 54, see FIG. 13. Gear 60 can move freely in the vertical direction and rotate freely. Gear 58 can move in the horizontal direction and rotate. When gear 58 is moved horizontally toward gear 60, it pushes gear 60 to move up and contact pawl 56. Rotating gear 58 causes gear 60 to rotate, which cause one of the teeth of pawl 56 to contact ratcheting gear 54. Automatic ratcheting reversal can be achieved by turning gear 58 in the opposite direction. When gear 58 is moved horizontally away from gear 60, gear 60 drops back down by gravity and force of spring (not shown) and disengage from pawl 56.

Another example of a reversible ratcheting gear is illustrated in U.S. Pat. No. 5,562,015, hereby incorporated by reference. A reversible ratcheting gear allows one-directional ratcheting, which is relative rotation between the concentric masts in either direction.

Description of the Side-by-Side Intermeshing Dual Rotor Aircraft

The non-intermeshing dual rotors are mounted at the tips of the main fixed wings in FIGS. 1-8. An intermeshing counterpart embodiment is to mount the counter-rotating dual rotors side-by-side on the fuselage so that the rotors intermesh, see FIGS. 15 and 16. Side-by-side intermeshing rotors are well known, such as the one disclosed in U.S. Pat. No. 2,521,012, and the K-Max helicopter by the Kamen Helicopter Company.

The intermeshing dual rotor arrangement has the following advantages over the non-intermeshing arrangement: First, the length of rotor blades are de-coupled from the length of main fixed wings, which allows an extra degree of freedom in optimizing the disc loading during rotary flight and fixed wing loadings during fixed wing flight. Second, mounting the rotors at the tips of the wings increases the structural requirement and the weight of the wings, while the intermeshing arrangement does not suffer the same penalty. Third, mounting the rotors at the tips of the wings creates a center of gravity overhang issue (discussed earlier), which requires chord extension of the swept wings near the tip, resulting in another weight penalty. The intermeshing arrangement does not suffer the same CG overhang issue due to the freedom to locate the intermeshing rotors along the longitudinal axis to align with the actual CG location.

The intermeshing dual rotor aircraft in FIGS. 15 and 16 operates similarly as the non-intermeshing counterpart in FIG. 1 with a few differences to be detailed in the following paragraph, and in particular achieves the benefits of the "segregated X-wing" configuration in FIG. 16.

Figure 15:
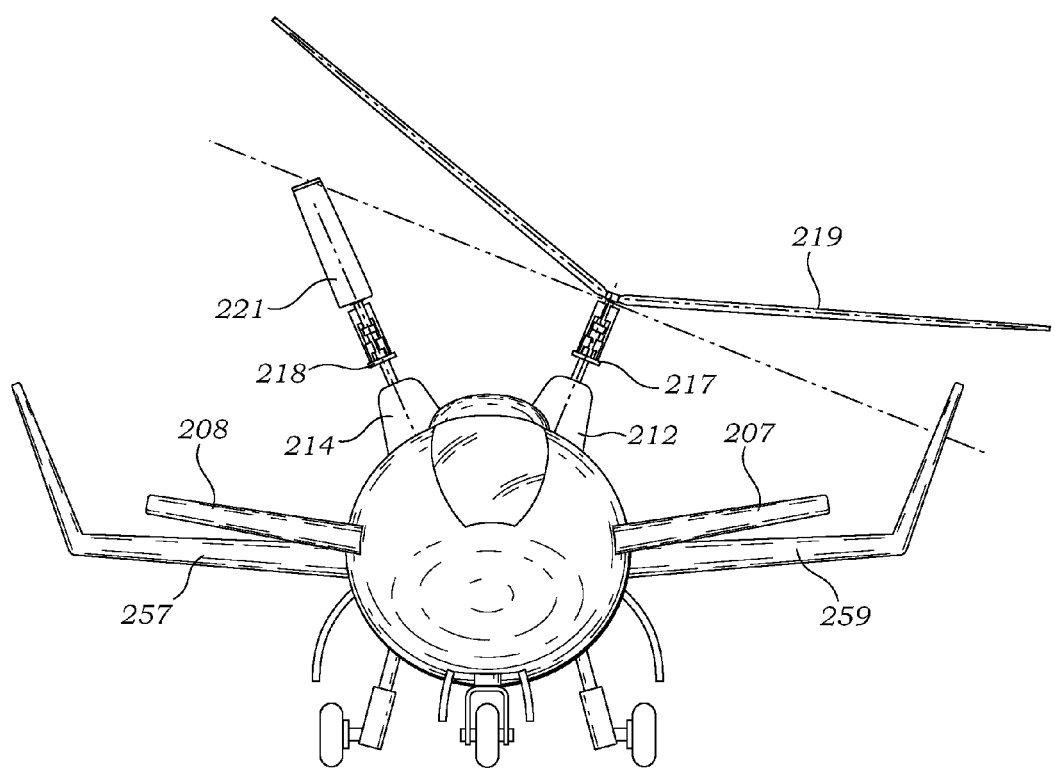
FIG. 15 is a front elevation view of an embodiment of the inventive aircraft with side-by-side intermeshing counter-rotating dual rotors.
Figure 16:
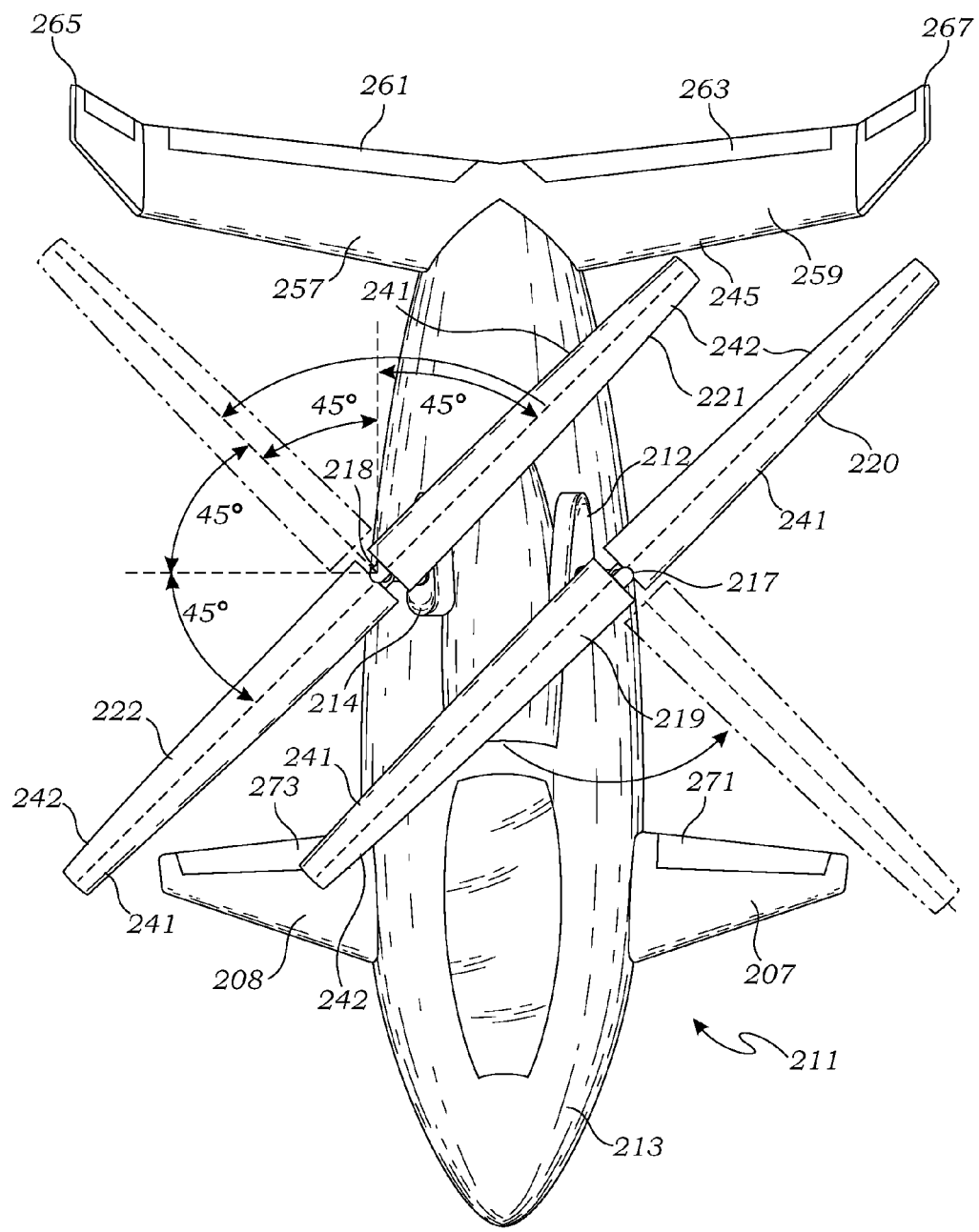
FIG. 16 is a top plan view of the aircraft in FIG. 15, illustrating how the rotors are stopped and re-positioned to the "segregated X-wing" configuration.

The intermeshing aircraft in FIGS. 15, 16 differ from the aircraft in FIG. 1 in several ways: 1) it does not have to have any main fixed wing as in FIG. 1, and instead has canard wings mounted forward of the aircraft to mitigate the problem of hover download, where the downwash from the rotors splashes on the main fixed wings under the rotors, and cancel out part of the lift. It should be noted that the intermeshing configuration could be used in combination with main fixed wings in an alternative embodiment (not shown). 2) The rotor blades incorporate a slight pre-cone angle so that in the segregated X-wing configuration in FIG. 16 all the blades are substantially horizontal. 3) To avoid collisions, the axes of the rotor masts are slanted outward at a slight angle so that the blades of one rotor go over the top of the other rotor, and the phase angle of the left rotor is set equal to the phase angle of the right rotor mirrored (for opposite rotation direction) and then offset by 90 degrees, see FIG. 15. For example, when the blades of the left rotor are pointing forward and aft, the blades of the right rotor should be pointing left and right. This is a common practice in intermeshing rotors. 4) To simplify operation and control of the engines, the aircraft in FIGS. 15, 16 utilizes two turbofan engines for forward propulsion, and a separate turboshaft engine for the intermeshing rotors during rotary flight. The use of the third engine is not a requirement but has the advantages of enhanced safety and simplified design which eliminates the transmission and complex control. The downside of the third engine is the extra weight of the engine, but the weight saving from eliminating the transmission helps offset that disadvantage.

During transition from rotary mode to fixed wing mode, both rotors are stopped at 45 degrees off the longitudinal axis of the fuselage where the blades of the two rotors are parallel to each other, as in FIG. 16. The canard wings and the horizontal tail assume the lift requirement during transition from rotary mode to fixed wing mode. For each rotor, the blade flying backward (219, 221) is rotated about the common axis of the masts by 90 degrees (see phantom positions of blades 219, 221) so that both blades are flying forward (air flow from leading edge 241 to trailing edge 242 of blades). The blades from the left and right rotors form an "X" shape, although the "X" is segregated in the center, and therefore referred to as "segregated X-wing". This configuration corresponds to counterpart configuration in the non-intermeshing aircraft in FIG. 4. The "segregated X-wing" configuration allows all four rotor-blades to fly in the correct direction to function as fixed wings to provide lift. The segregated X-wing has the advantages over the flipped airfoil X-wing aircraft in U.S. Pat. No. 5,405,104 because it does not require flipping any blade or flaps on the blade. It has the advantages of low-drag over the X-wing aircraft in U.S. Pat. No. 4,711,415 because it can use airfoils with rounded leading edges 41 and tapered trailing edges 42 to reduce drag. The "segregated X-wing" configuration in FIG. 16 can be used to provide lift throughout the entire fixed wing flight, and therefore the blades do not have to be placed in the trailing positions. To the knowledge of the authors of this invention, the "segregated X-wing" configuration formed by the intermeshing counter-rotating dual rotors itself is a novel and useful concept, without depending on the novelty and usefulness of the rotor assembly in FIGS. 9-11.

In an alternative embodiment of the aircraft with side-by-side intermeshing rotors, main fixed wings are used instead of the canard wings.

One of the challenges in designing a stopped rotor aircraft is how to make the rotor stoppable. The main rotor of a helicopter often relies on the centrifugal forces to remain stiff while lifting the weight of the aircraft. To be efficient in rotary flight the blades often have high aspect ratio. If the rotor is stopped in high speed flight, the aerodynamic forces often creates tremendous stresses on the blades leading to blade failure. In order to overcome this problem, the side-by-side counter-rotating rotors of this invention, either intermeshing or non-intermeshing, can further comprise of telescopic blades such as those in U.S. Pat. No. 2,163,482, U.S. Pat. No. 2,637,406, U.S. Pat. No. 2,996,121, U.S. Pat. No. 5,642,982, U.S. Pat. No. 5,655,879, and U.S. Pat. No. 6,923,622. Rotors with telescopic blades are often referred to as "variable diameter rotors", or "variable length rotors". The extension and retraction of the telescopic blades are typically controlled by mechanical devices such as jackscrews, wires, chains or by springs. The variable length rotor is particularly useful in that as the rotors slow down, the centrifugal forces decrease, and the length of the rotor blades can be reduced, which in turn increases the stiffness of the blades and reduces the aspect ratio, which makes it possible to stop the rotors.

The invention described and claimed herein is useful for various applications. It has application for all missions requiring V/STOL and hover capability. It can be used for various military and commercial applications. This aircraft is particularly useful as a commuter or general aviation/business aircraft, which would alleviate the congestion problems of the current major airports. Since the aircraft can take off and land in a small area without a runway, the time required to drive to the airport, go through security check, wait for the boarding and drive again to destination can be saved. In addition and more importantly, this aircraft has the potential to greatly enhance the safety of aerial transportation due to its ability to auto-rotate and descend safely to ground in the cases of engine failure caused by such factors as "bird strike". The enhanced safety can be preserved in the fixed wing mode since the aircraft can convert back to rotary wing mode rapidly without operational engines.

Throughout this application, various references are made to parallel, within certain planes, and to specific geometric angles (e.g., 45 degrees, 90 degrees, etc.), and all of these terms a hereby specifically defined to mean approximately these relationships, as would be considered equivalent or within acceptable ranges as determined by one skilled in the art. If an engineer skilled in the art would consider the relationship to be functionally equivalent, it should be considered within the scope of the present invention, and no specific geometric measurements should be considered controlling.

Although an exemplary embodiment of the invention has been shown and described, many changes, modifications, and substitutions may be made by one having ordinary skill in the art without departing from the spirit and scope of the invention. Therefore, the invention is not to be limited except by the scope of the claims.

What is claimed is:
1. A rotor comprising:
  two rotor blades, each having a rounded leading edge and a tapered trailing edge to reduce drag and improve lift efficiency;
  two concentric masts, each for operably mounting one of the plurality of rotor blades at two different elevations substantially parallel to a plane of rotation;
  a locking element for selectively locking and unlocking the concentric masts such that an angle between any two rotor blades may be variable within the plane of rotation during flight when the locking element is unlocked;
  a feathering hinge attached to each blade for changing the pitch of each blade with respect to the plane of rotation; and
  a pitch control mechanism operably attached to the feathering hinges of the blades for controlling the pitches of the blades collectively.
2. The rotor as recited in claim 1, further comprising a rotor enclosure adapted to be pivotally mounted on an aircraft, the lower parts of concentric masts being operably mounted within the rotor enclosure.

3. The rotor as recited in claim 1, wherein the locking element enables the angle between any two rotor blades to be variable between 0-360 degrees within the plane of rotation during flight.

4. An aircraft capable of flying in both rotary wing mode and fixed wing mode, the aircraft comprising:
- a fuselage having right and left sides;
- two fixed wings extending from the left and right sides of the fuselage;
- two rotor enclosures mounted on or adjacent to the fuselage and/or the two fixed wings; and
- a pair of rotors, each of the rotors being operably mounted on one of the rotor enclosures, each of the rotors comprising:
  - two rotor blades, each having a rounded leading edge and a tapered trailing edge to reduce drag and improve lift efficiency;
  - two concentric masts, each for operably mounting one of the plurality of rotor blades at two different elevations;
  - a locking element for selectively locking or unlocking the concentric masts together, enabling the angle between any two rotor blades to be variable from 0-360 degrees during flight when the locking element is unlocked;
  - a feathering hinge attached to each blade for changing the pitch of each blade with respect to the plane of rotation; and
  - a pitch control mechanism operably attached to the feathering hinges of the blades for controlling the pitches of the blades collectively.

5. The aircraft of claim 4, further comprising:
- wherein the aircraft may fly in the fixed wing mode in which the rotor blades are stopped in the plane of rotation and the angles between the rotor blades of each rotor are reduced in the plane of rotation so that the rotor blades may be configured and positioned in any of the following manners: a) all rotor blades of each rotor function as fixed wings in blade advancing regions; b) some of the rotor blades functions as fixed wings and the rest of rotor blades are positioned at the trailing positions; and c) all of the rotor blades of each rotor are positioned at the trailing position; and
- wherein the aircraft may fly in the rotary wing mode in which the rotor blades of each rotor are substantially evenly spaced in the plane of rotation so that when the rotor blades are rotated they provide lift to enable the aircraft to fly vertically, hover, and fly translationally at relatively low speeds.

6. The aircraft of claim 4, wherein, when the aircraft transitions in flight from rotary wing mode to fixed wing mode, the aircraft enters an intermediate flight regime during which the main fixed wings provides lift to the aircraft, thereby enabling the rotors to be free of lift requirement in order that the rotor blades may be stopped, and positioned into their fixed wing configuration.

7. The aircraft as recited in claim 6, wherein substantially all of the aerodynamic lift for the aircraft during said intermediate flight regime is provided by lifting surfaces other than the rotors.

8. The aircraft as recited in claim 4, further comprising at least one jet engine operably mounted on the aircraft for horizontal propulsion of the aircraft; and a transmission for operably connecting the at least one jet engine with the pair of rotors for turning the rotor blades.

9. An aircraft capable of flying in both rotary wing mode and fixed wing mode, the aircraft comprising:
- a fuselage having a top, right and left sides, and a longitudinal axis;
- two fixed wings extending from the left and right sides of the fuselage; and
- a pair of counter rotating rotors mounted on the top of the fuselage laterally transverse to the longitudinal axis of the fuselage, each of the rotors comprising:
  - a pair of rotor blades, each having a rounded leading edge and a tapered trailing edge to reduce drag and improve lift efficiency;
  - a pair of concentric masts, each for operably mounting one of the plurality of rotor blades;
  - a locking element for selectively locking or unlocking the concentric masts together in a plane of rotation, enabling the angle between the two rotor blades to be variable during flight when the locking element is unlocked;
  - a feathering hinge attached to each blade for changing the pitch of each blade with respect to the plane of rotation; and
  - a pitch control mechanism operably attached to the feathering hinges of the blades for controlling the pitches of the blades collectively,
- whereby the counter rotating rotors are operably mounted such that the rotors intermesh with each other in the rotary wing mode.

10. The aircraft of claim 9, further comprising:
- wherein the aircraft may fly in the fixed wing mode in which the rotor blades of each rotor are stopped in the plane of rotation and the angles between the blades of each rotor are reduced to 90 degrees in the plane of rotation of each rotor so that the rotor blades may be configured and positioned such that all four rotor blades function as fixed wings in blade advancing regions, with two blades at 45 degrees forward swept and two blades at 45 degrees aft swept; and
- wherein the aircraft may fly in the rotary wing mode in which the two rotor blades of each rotor are spaced at 180 degrees in the plane of rotation of each rotor so that when the rotor blades are rotated they provide lift to enable the aircraft to fly vertically, hover, and fly translationally at relatively low speeds.

* * * * *